US010516465B2

(12) United States Patent
Yu et al.

(10) Patent No.: US 10,516,465 B2
(45) Date of Patent: Dec. 24, 2019

(54) HARMONIZED OPERATION BETWEEN RADIO LINK MONITOR AND BEAM FAILURE RECOVERY

(71) Applicant: MEDIATEK INC., Hsinchu (TW)

(72) Inventors: Chia-Hao Yu, Hsinchu (TW);
Yuanyuan Zhang, Beijing (CN);
Hsuan-Li Lin, Hsinchu (TW);
Jiann-Ching Guey, Hsinchu (TW)

(73) Assignee: MEDIATEK INC. (TW)

( * ) Notice: Subject to any disclaimer, the term of this patent is extended or adjusted under 35 U.S.C. 154(b) by 0 days.

(21) Appl. No.: 16/126,546

(22) Filed: Sep. 10, 2018

(65) Prior Publication Data

US 2019/0081689 A1    Mar. 14, 2019

Related U.S. Application Data

(60) Provisional application No. 62/556,554, filed on Sep. 11, 2017.

(51) Int. Cl.
*H04B 7/06* (2006.01)
*H04B 7/08* (2006.01)
(Continued)

(52) U.S. Cl.
CPC ........... *H04B 7/0695* (2013.01); *H04B 7/088* (2013.01); *H04W 24/04* (2013.01); *H04W 24/10* (2013.01);
(Continued)

(58) Field of Classification Search
CPC .................................................. H04W 72/046
See application file for complete search history.

(56) References Cited

U.S. PATENT DOCUMENTS

2010/0113008 A1* 5/2010 Wang ........................ H04L 1/20
   455/423
2011/0242969 A1  10/2011 Dayal et al. .................. 370/225
(Continued)

FOREIGN PATENT DOCUMENTS

CN      104509018 A     8/2012
CN      107005858 A     2/2015
WO    WO2011127021 A1   4/2010

OTHER PUBLICATIONS

International Search Report and Written Opinion of International Search Authority for PCT/CN2018/105006 dated Nov. 29, 2018 (9 pages).
(Continued)

*Primary Examiner* — Kevin Kim
(74) *Attorney, Agent, or Firm* — Imperium Patent Works; Zheng Jin

(57) ABSTRACT

A method for harmonized operation between radio link monitor and beam failure recovery is proposed. In one example, upon indication of unsuccessful recovery from beam failure, a counter is initiated to count a configured number of OOS indication before RLF is declared due to beam failure. In another example, upon indication of successful recovery from beam failure, a counter is initiated to count a configured number of IS indication before starting over RLM procedure on its previous observations on failed beams. As a result, either early RLF declaration or RLM reset may be triggered based on BFR procedure to more accurately maintain the link quality.

14 Claims, 8 Drawing Sheets

(51) Int. Cl.
  *H04W 24/10*   (2009.01)
  *H04W 36/06*   (2009.01)
  *H04W 72/04*   (2009.01)
  *H04W 74/08*   (2009.01)
  *H04W 24/04*   (2009.01)
  *H04W 16/28*   (2009.01)

(52) U.S. Cl.
  CPC ......... *H04W 36/06* (2013.01); *H04W 72/046* (2013.01); *H04W 74/0833* (2013.01); *H04W 16/28* (2013.01)

(56) References Cited

U.S. PATENT DOCUMENTS

2014/0043988  A1    2/2014   Chen et al. ................... 370/252
2016/0353510  A1   12/2016   Zhang et al. ............. 370/329 A
2018/0368124  A1*  12/2018   Liu ................... H04W 72/0413

OTHER PUBLICATIONS

R1-1714334 3GPP TSG RAN WG1 Meeting #90, Huawei et al., "Relationship between beam failure recovery and RLF", Prague, Czech Republic, Aug. 21-25 (5 pages) *section 1-3*.

R1-1713385 3GPP TSG-RAN WG1 RAN1 #90, Qualcomm Incorporated, "Radio link monitoring consideration", Prague, CZ, Aug. 21-25, 2017 (7 pages) *the whole document*.

\* cited by examiner

HARMONIZED OPERATION BETWEEN RADIO LINK MONITOR AND BEAM FAILURE RECOVERY

CROSS REFERENCE TO RELATED APPLICATIONS

This application claims priority under 35 U.S.C. § 119 from U.S. Provisional Application No. 62/556,554, entitled "Method for Harmonized Operation between Radio Link Monitor and Beam Recovery," filed on Sep. 11, 2017, the subject matter of which is incorporated herein by reference.

TECHNICAL FIELD

The disclosed embodiments relate generally to wireless communication, and, more particularly, to harmonized operation between radio link monitor and beam failure recovery in a Millimeter Wave (mmW) beamforming new radio (NR) system.

BACKGROUND

The bandwidth shortage increasingly experienced by mobile carriers has motivated the exploration of the under-utilized Millimeter Wave (mmWave) frequency spectrum between around 30 G and 300 G Hz for the next generation broadband cellular communication networks. The available spectrum of mmWave band is hundreds of times greater than the conventional cellular system. The mmWave wireless network uses directional communications with narrow beams and can support multi-gigabit data rate. The under-utilized bandwidth of the mmWave spectrum has very small wavelengths, which enables large number of miniaturized antennas to be placed in a small area. Such miniaturized antenna system can produce high beamforming gains through electrically steerable arrays generating directional transmissions. With recent advances in mmWave semiconductor circuitry, mmWave wireless system has become a promising solution for real implementation. However, the heavy reliance on directional transmissions and the vulnerability of the propagation environment present particular challenges for the mmWave network with beamforming.

In principle, beam management mechanism, which includes both initial beam alignment and subsequent beam tracking, ensures that base station (BS) beam and user equipment (UE) beam are aligned for data communication. To ensure beam alignment, beam-tracking operation should be adapted in response to channel changes. However, in mmWave systems, transmission path lifetime is expected one order of magnitude shorter than traditional cellular bands due to wavelength difference. Combined with dedicated beam with small spatial coverage, the number of effective transmission paths for a dedicated beam could be rather limited, thus more vulnerable to UE movements and environmental changes. Beam failure recovery mechanism is designed to handle the rare case beam tracking issue, e.g., when feedback rate for beam management may not be frequent enough. For example, sudden blockage can result in lost connection and beam failure.

Radio link monitor (RLM) is designed to ensure proper link quality can be achieved from higher layer perspective, e.g., radio resource control (RRC) layer. RLM exists in single-beam systems such as LTE systems. Under RLM, periodic physical layer L1 indications on link quality, e.g., In-Sync and Out-of-Sync (IS/OOS) indications, are monitored. Radio link failure (RLF) can be declared upon consecutive OOS exceeds number $N_{OOS}$ and accumulative IS does not reach number $N_{IS}$ before the expiry of $T_{IS}$ timer.

For beamformed access system, both beam recovery procedure and RLM procedure are essential to link quality maintenance. Interaction between the two procedures for harmonized operation is required.

SUMMARY

A method for harmonized operation between radio link monitor and beam failure recovery is proposed. In one example, upon indication of unsuccessful recovery from beam failure, a counter is initiated to count a configured number of OOS indication before RLF is declared due to beam failure. In another example, upon indication of successful recovery from beam failure, a counter is initiated to count a configured number of IS indication before starting over RLM procedure on its previous observations on failed beams. As a result, either early RLF declaration or RLM reset may be triggered based on BFR procedure to more accurately maintain the link quality.

In one embodiment, a UE detects a beam failure condition of a serving beam pair link (BPL) in a beamforming communication network, wherein the UE initiates a beam failure recovery (BFR) procedure and transmits a beam failure recovery (BFRQ) message when the beam failure condition is met. The UE initiates a radio link monitor (RLM) procedure by periodically providing In-Sync (IS) and Out-of-Sync (OOS) indications of the serving BPL. The UE determines a BFR procedure result based on whether the UE receives a network response to the BFRQ message. The UE generates an output to the RLM procedure by counting the IS and OOS indications.

In another embodiment, a UE transmits a random-access preamble over a random-access channel (RACH) in a beamforming communication network. The UE monitors a random-access response (RAR) from the network within an RAR window. The UE transmits an uplink request with a UE identification to the network. The uplink request comprises a MAC control element (CE) to identify a UE purpose. The UE receives a contention resolution message with the matching UE identification from the network to complete a contention resolution.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
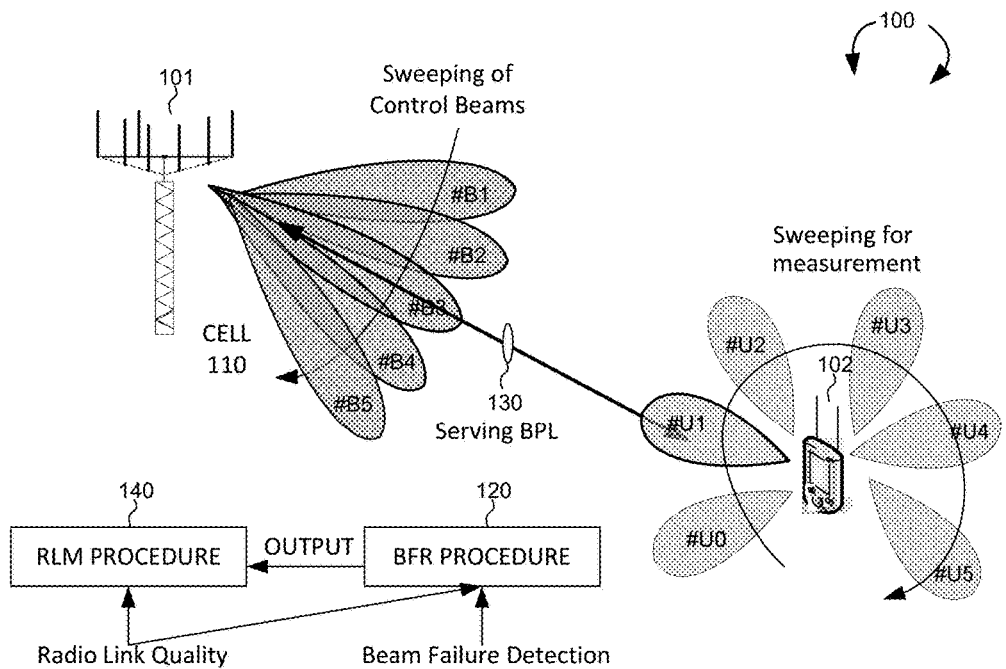
FIG. 1 illustrates a beamforming wireless communication system supporting interaction between radio link monitor (RLM) and beam failure recovery (BFR) in accordance with one novel aspect.

FIG. 1 illustrates a beamforming wireless communication system 100 supporting interaction between radio link monitor (RLM) and beam failure recovery (BFR) in accordance with one novel aspect. Beamforming mmWave mobile communication network 100 comprises a base station BS 101 and a user equipment UE 102. The mmWave cellular network uses directional communications with beamformed transmission and can support up to multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of TX/RX beams. For example, cell 110 is covered by a set of five BS beams #B1, #B2, #B3, #B4, and #B5. The collection of the BS beams #B1-#B5 covers an entire service area of cell 110. Similarly, UE 102 may also apply beamforming to form multiple UE beams, e.g., #U1, #U2, #U3, #U4 and #U5.

The set of BS beams may be periodically configured or occur indefinitely and repeatedly in order known to the UEs. Each BS beam broadcasts minimum amount of cell-specific and beam-specific information similar to System Information Block (SIB) or Master Information Block (MIB) in LTE systems, or synchronization signal block (SSB) in NR systems. Each BS beam may also carry UE-specific control or data traffic. Each BS beam transmits a set of known reference signals for the purpose of initial time-frequency synchronization, identification of the beam that transmits the signals, and measurement of radio channel quality for the beam that transmits the signals. In one example, a hierarchical control beam and dedicated data beam architecture provides a robust control-signaling scheme to facilitate the beamforming operation in mmWave cellular network systems.

In principle, beam training mechanism, which includes both initial beam alignment and subsequent beam tracking, ensures that BS beam and UE beam are aligned for data communication. For beamformed access, both ends of a link need to know which beamformers to use, e.g., a beam pair link (BPL). In downlink (DL)-based beam management, the network (NW) side provides opportunities for UE to measure beamformed channel of different combinations of BS beams and UE beams. Apparently, UE has the most up-to-date beamformed channel state in DL-based beam management. NW learns the beamformed channel state based on UE feedback. The feedback rate for beamformed channel state is selected to take care of most beam tracking need. For rare cases beam tracking issue, however, such feedback rate for beam management may not be frequent enough.

A beam failure recovery (BFR) procedure 120 is designed to handle the rare case beam tracking issue, e.g., sudden blockage that results in lost connection and beam failure. Under the BFR procedure, UE 102 first detects a beam failure condition of the original serving beam pair link (BPL) 130 formed between BS beam #B3 and UE beam #U1. UE 102 also performs measurements for candidate BPL selection. Next, UE 102 transmits a beam failure recovery request (BFRQ) message to BS 101 upon the triggering condition for BFRQ transmission is satisfied. Finally, UE 102 monitors network response to decide the success or failure of the BFR attempt.

Radio link monitor (RLM) is designed to ensure proper link quality can be achieved from higher layer perspective, e.g., radio resource control (RRC) layer. RLM exists in single-beam systems such as LTE system. Under RLM, periodic physical layer L1 indications on link quality, e.g., In-Sync and Out-of-Sync (IS/OOS) indications, are monitored. Radio link failure (RLF) will be declared upon consecutive OOS exceeds number $N_{OOS}$ and accumulative IS does not reach number $N_{IS}$ before the expiry of $T_{IS}$ timer. For beamformed access system 100, both BFR procedure 120 and RLM procedure 140 are essential to link quality maintenance.

In accordance with one novel aspect, a method for harmonized operation between radio link monitor and beam failure recovery is proposed. In one example, upon indication of unsuccessful recovery from beam failure, a counter is initiated to count a configured number of OOS indication before RLF is declared due to beam failure. In another example, upon indication of successful recovery from beam failure, a counter is initiated to count a configured number of IS indication before starting over RLM procedure on its previous observations on failed beams. As a result, either early RLF declaration or RLM reset may be triggered based on BFR procedure to more accurately maintain the link quality.

Figure 2:
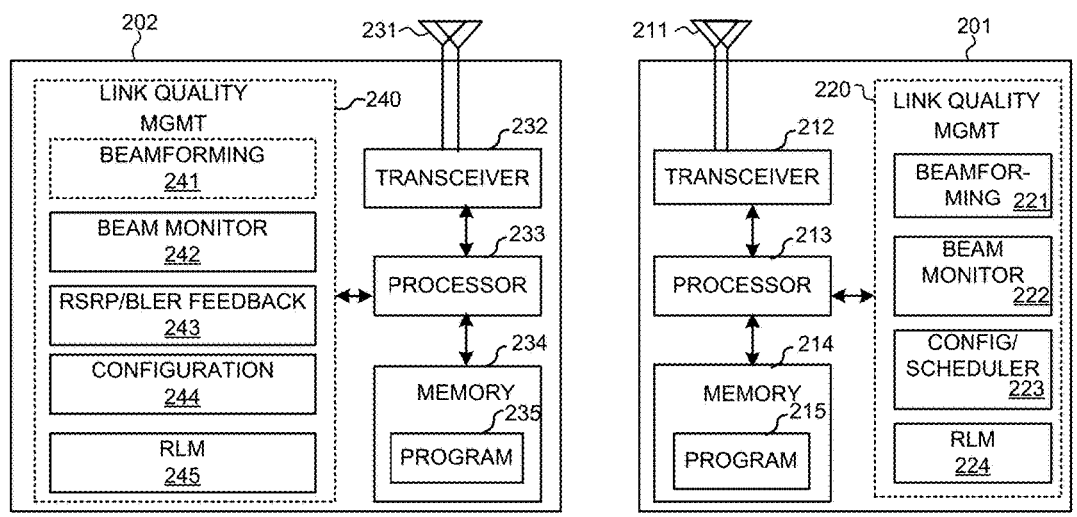
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuits that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signal and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. For example, BS 201 comprises a link quality management module 220, which further comprises a beamforming circuit 221, a beam monitor 222, a config and scheduling circuit 223, and an RLM handling circuit 224. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Config and scheduling circuit 223 schedules uplink transmission for UEs and configures radio resources for UEs for uplink transmission. It also configures timer and counter values between BFR and RLM coordination. RLM handling circuit performs physical layer radio link monitor functionality.

Similarly, UE 202 comprises a link quality management module 240, which further comprises a beamforming circuit 241, a beam monitor 242, a RSRP/BLER (reference signal received power or block error rate) feedback circuit 243, a configuration circuit 244, and an RLM handling circuit 245. Beamforming circuit 241 may belong to part of the RF chain, which applies various beamforming weights to multiple antenna elements of antenna 231 and thereby forming various beams. Beam monitor 242 monitors received radio signals and performs measurements of the radio signals over the various beams and maintains a ranking of its preferred BPLs. RSRP/BLER feedback circuit 243 provides beam quality feedback information to BS 201 for BPL alignment status determination. Configuration circuit 244 receives beam failure recovery configuration from BS 201, which includes beam failure recovery trigger conditions, beam failure recovery resources, and UE monitor/report behavior. Configuration circuit 244 also receives timer and counter values for coordination between BFR and RLM procedures. RLM handling circuit 245 performs radio link monitor functionality.

Figure 3:
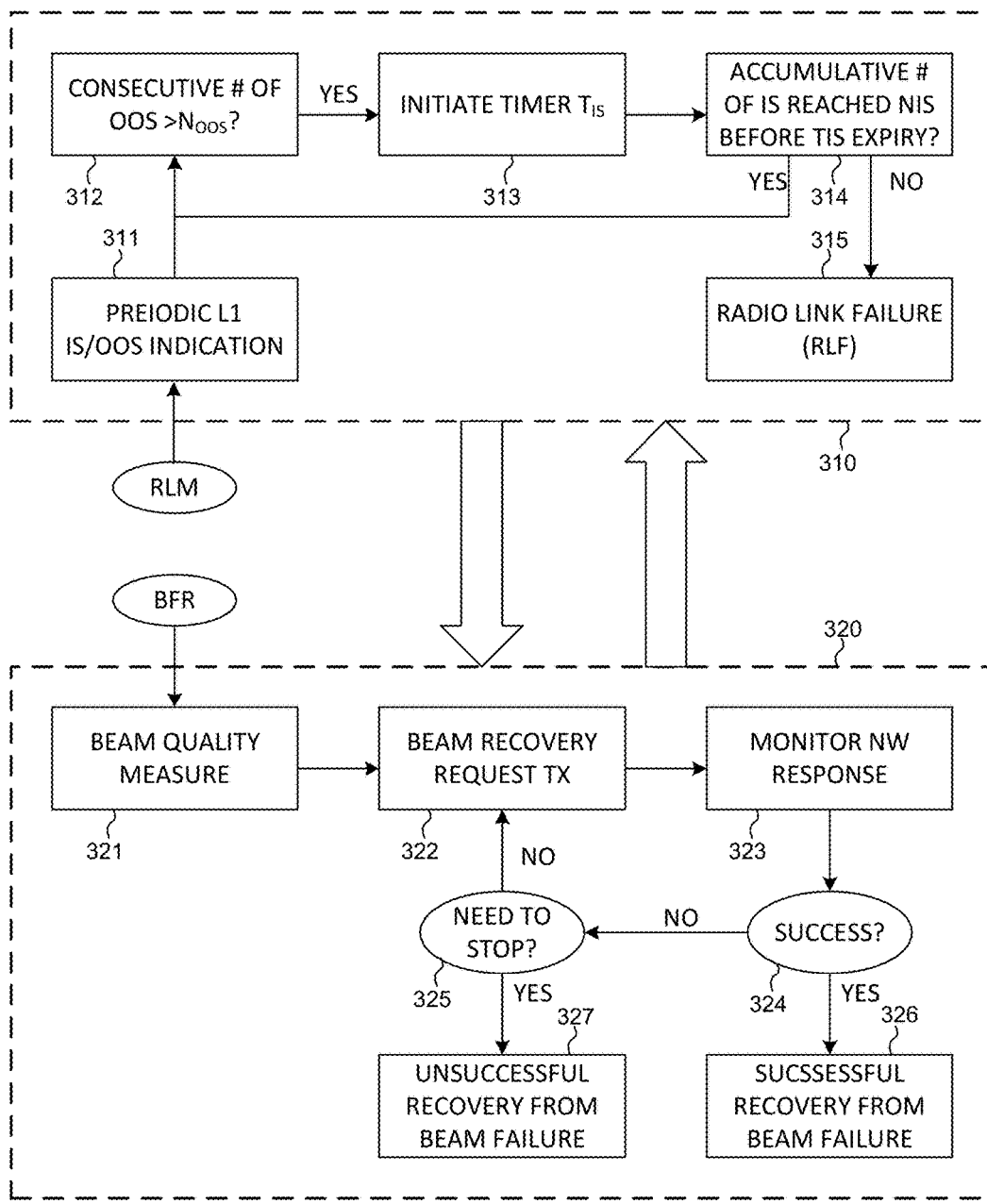
FIG. 3 illustrates the high-level flow of RLM and BFR procedures and the concept of interaction between RLM and BFR procedures.

FIG. 3 illustrates the high-level flow of RLM and BFR procedures and the concept of interaction between RLM and BFR procedures. Under the RLM procedure (310), UE periodically monitors L1 radio signal and generates IS/OOS indications (311). UE determines whether a consecutive number of OOS indications exceeds a threshold $N_{OOS}$ (312). If the answer is yes, then UE initiates a timer $T_{IS}$ (313). UE then determines whether an accumulative number of IS indications reaches a threshold $N_{IS}$ before $T_{IS}$ expiry (314). If the answer is yes, then UE goes back to step 312 and continues counting OOS indications. If the answer is no, then RLF is declared (315). Under the BFR procedure (320), UE measures beam quality (321), and transmits a BFRQ message upon detecting beam failure of serving BPL and identifying new candidate BPL (322). UE then monitors network response to the BFRQ (323). If UE receives NW response (324), then UE determines that it has successfully recovered from beam failure. If UE does not receive NW response, then UE decides whether it needs to stop the BFR procedure (325). If the answer is no, then UE continues to transmit BFRQ to the network (322). If the answer is yes, then UE determines that the BFR procedure is unsuccessful (327). In accordance with one novel aspect, RLM procedure 310 and BFR procedure 320 interact with each other to provide accurate link quality maintenance.

Figure 4:
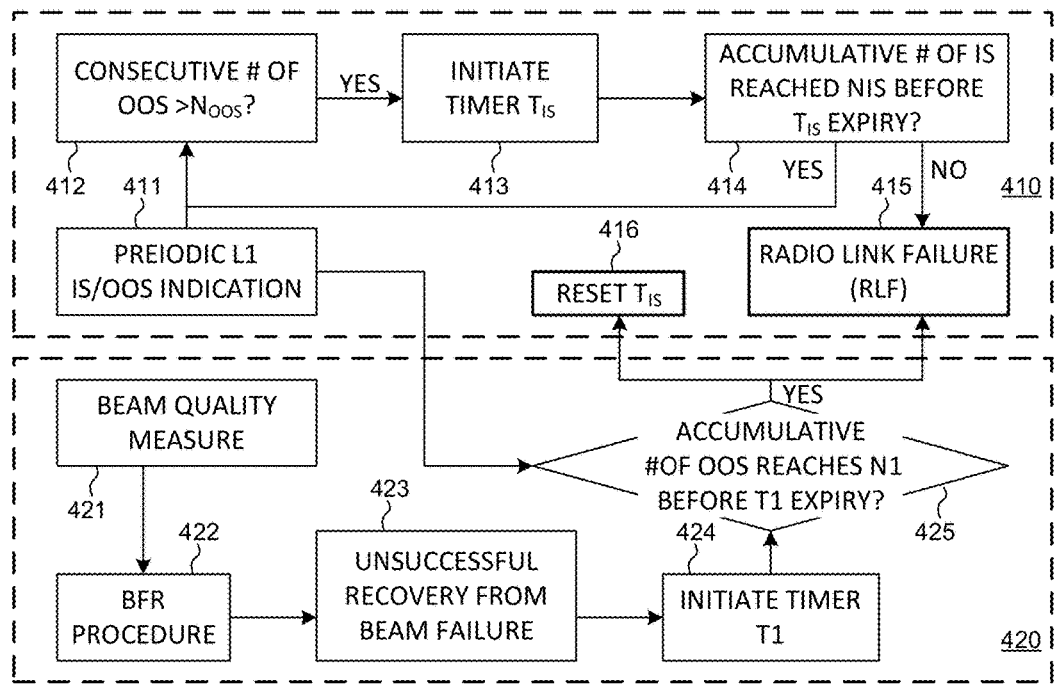
FIG. 4 illustrates a first embodiment of early RLF declaration due to unsuccessful BFR.

FIG. 4 illustrates a first embodiment of early RLF declaration due to unsuccessful BFR. In the embodiment of FIG. 4, the RLM procedure 410 is similar to the RLM procedure 310 depicted in FIG. 3, e.g., steps 411 to 415 are similar to steps 311 to 315. The BFR procedure 420 of FIG. 4 is modified based on the BFR procedure 320 of FIG. 3. Under the embodiment of FIG. 4, an indication can be provided to RRC (where RLM procedure is overseen) upon unsuccessful recovery from beam failure. The indication can trigger RRC to observe certain amount of OOS indications before RLF can be declared due to unsuccessful recovery from beam failure. As a result, the BFR procedure may cause an early RLF declaration.

Under the BFR procedure 420, UE measures beam quality of the serving BPL(s) in step 421 and initiates the BFR procedure upon detecting beam failure and identifying new BPL in step 422. In step 423, UE determines that the BFR procedure is unsuccessful and sends an indication to RRC. The indication initiates a timer T1 accordingly (step 424). In step 425, UE determines whether an accumulative number of OOS indications has reached a threshold N1 before timer T1 expiry. If the answer is YES, then UE goes to step 415 and declares RLF. UE also resets the $T_{IS}$ timer for the RLM procedure (step 416). If the answer is NO, then no RLF is declared. Note that upon BFR unsuccessful indication, the BFR procedure is refrained from further beam failure recovery attempt for the current serving BPL(s). The values for timer T1 and counter N1 can be configured by the network.

Figure 5:
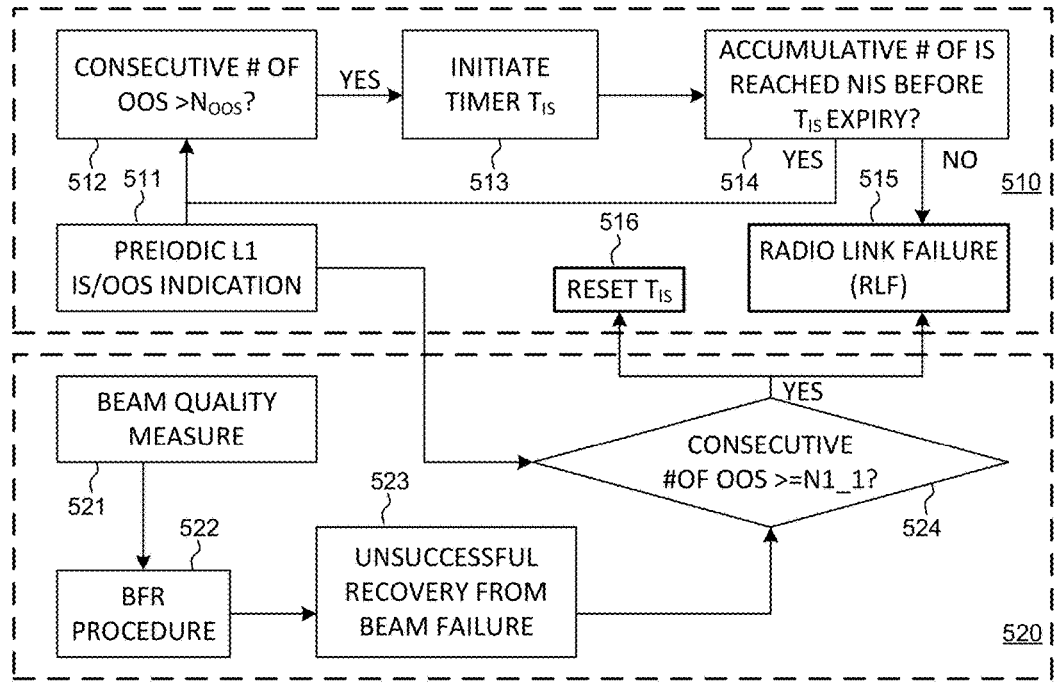
FIG. 5 illustrates a second embodiment of early RLF declaration due to unsuccessful BFR.

FIG. 5 illustrates a second embodiment of early RLF declaration due to unsuccessful BFR. The embodiment of FIG. 5 is similar to the embodiment of FIG. 4. However, in the embodiment of FIG. 5, no timer T1 is initiated upon BFR unsuccessful indication. Instead, the indication initiates a counter to start counting consecutively observed OOS indications. In step 524, UE determines whether a consecutive number of OOS indications has reached a threshold N1_1, which can be configured by the network. If the answer is YES, then UE goes to step 515 and declares RLF. UE also resets the $T_{IS}$ timer for the RLM procedure (step 516). If the answer is NO, then no RLF is declared.

Figure 6:
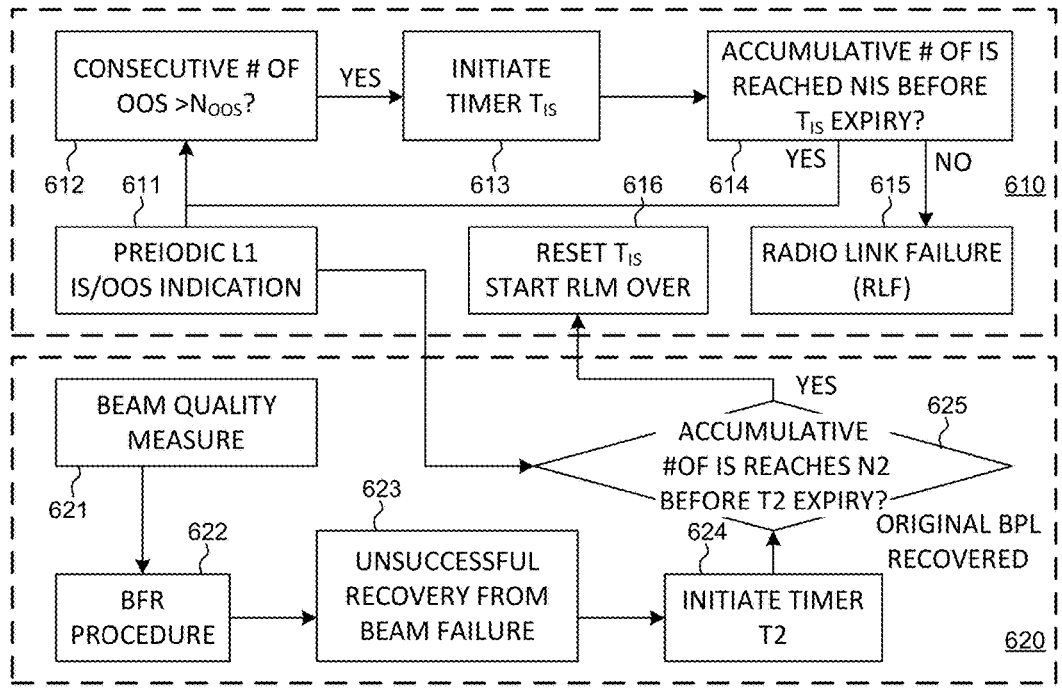
FIG. 6 illustrates a first embodiment of RLM reset due to late recovery from beam failure.

FIG. 6 illustrates a first embodiment of RLM reset due to late recovery from beam failure. In the embodiment of FIG. 6, the RLM procedure 610 is similar to the RLM procedure 310 depicted in FIG. 3, e.g., steps 611 to 615 are similar to steps 311 to 315. The BFR procedure 620 of FIG. 6 is modified based on the BFR procedure 320 of FIG. 3. Under the embodiment of FIG. 6, an indication can be provided to RRC (where RLM procedure is overseen) upon unsuccessful recovery from beam failure. The indication can trigger RRC to observe certain amount of IS indications before RLM can be reset. As a result, the BFR procedure may cause RLM reset.

Under the BFR procedure 620, UE measures beam quality of the serving BPL(s) in step 621 and initiates the BFR procedure upon detecting beam failure and identifying new BPL in step 622. In step 623, UE determines that the BFR procedure is unsuccessful and sends an indication to RRC. The indication initiates a timer T2 accordingly (step 624). In step 625, UE determines whether an accumulative number of IS indications has reached a threshold N2 before timer T2 expiry. If the answer is YES, an indication can be provided to RRC, which optionally resets the $T_{IS}$ timer and starts over RLM procedure 610 (step 616). RRC also sends an indication to BFR procedure 620 to inform that the original serving BPL is recovered. Note that upon BFR unsuccessful indication, the BFR procedure is refrained from further beam failure recovery attempt for the current serving BPL(s). However, upon "the original serving BPL recovered" indication, the PFR procedure is free to perform beam failure recovery for the current serving BPLs. The values for timer T2 and counter N2 can be configured by the network.

Figure 7:
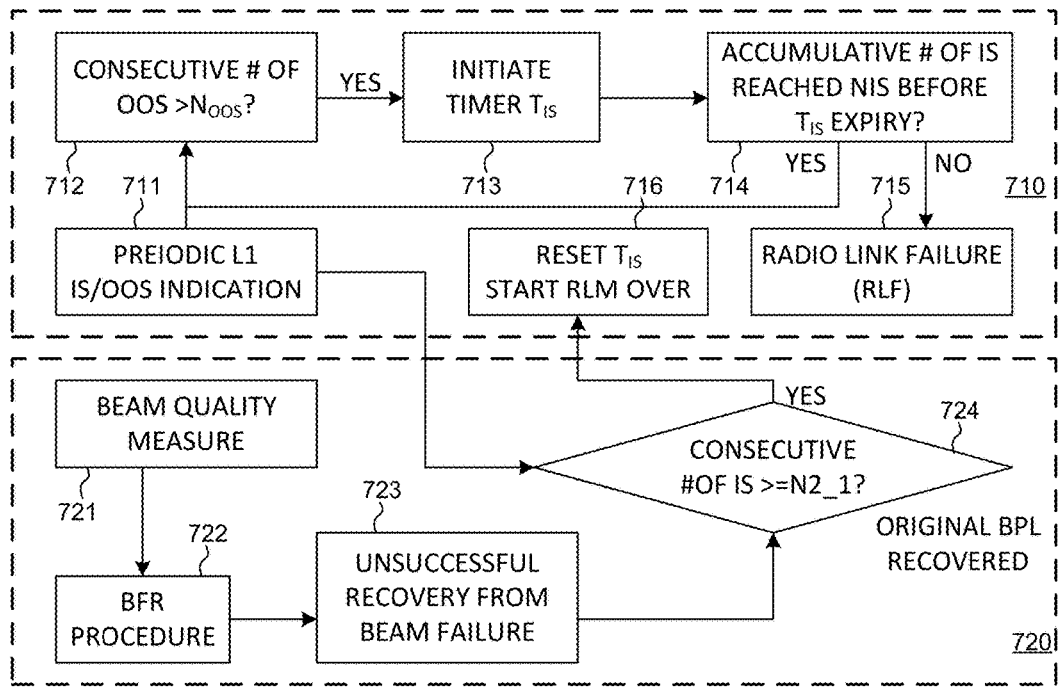
FIG. 7 illustrates a second embodiment of RLM reset due to late recovery from beam failure.

FIG. 7 illustrates a second embodiment of RLM reset due to late recovery from beam failure. The embodiment of FIG. 7 is similar to the embodiment of FIG. 6. However, in the embodiment of FIG. 7, no timer T2 is initiated upon BFR unsuccessful indication. Instead, the indication initiates a counter to start counting consecutively observed IS indications. In step 724, UE determines whether a consecutive number of IS indications has reached a threshold N2_1, which can be configured by the network. If the answer is YES, then an indication can be provided to RRC, which optionally resets the $T_{IS}$ timer and starts over RLM procedure 710 (step 716). RRC also sends an indication to BFR procedure 720 to inform that the original serving BPL is recovered.

Figure 8:
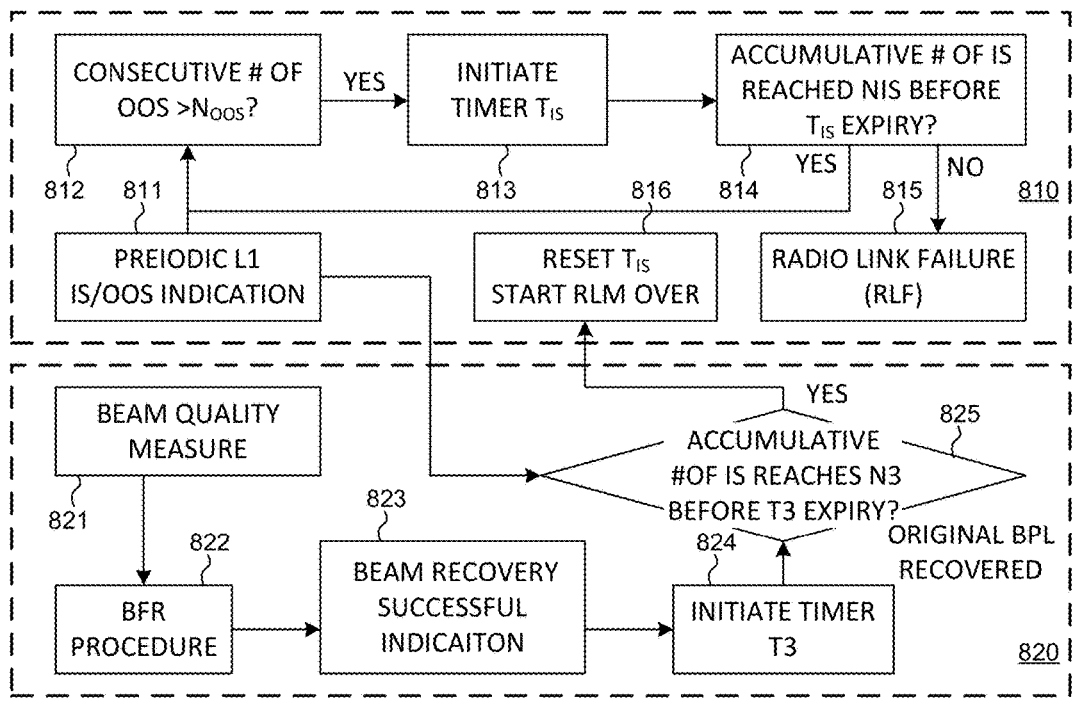
FIG. 8 illustrates a first embodiment of early RLM reset due to successful BFR.

FIG. 8 illustrates a first embodiment of early RLM reset due to successful BFR. In the embodiment of FIG. 8, the RLM procedure 810 is similar to the RLM procedure 310 depicted in FIG. 3, e.g., steps 811 to 815 are similar to steps 311 to 315. The BFR procedure 820 of FIG. 8 is modified based on the BFR procedure 320 of FIG. 3. Under the embodiment of FIG. 8, an indication can be provided to RRC (where RLM procedure is overseen) upon successful recovery from beam failure. The indication can trigger RRC to observe certain amount of IS indications before RLM can be reset. As a result, the BFR procedure may cause early RLM reset.

Under the BFR procedure 820, UE measures beam quality of the serving BPL(s) in step 821 and initiates the BFR procedure upon detecting beam failure and identifying new BPL in step 822. In step 823, UE determines that the BFR procedure is successful and sends an indication to RRC. The indication initiates a timer T3 accordingly (step 824). In step 825, UE determines whether an accumulative number of IS indications has reached a threshold N3 before timer T3 expiry. If the answer is YES, an indication can be provided to RRC, which optionally resets the $T_{IS}$ timer and starts over RLM procedure 810 (step 816). The values for timer T3 and counter N3 can be configured by the network.

Figure 9:
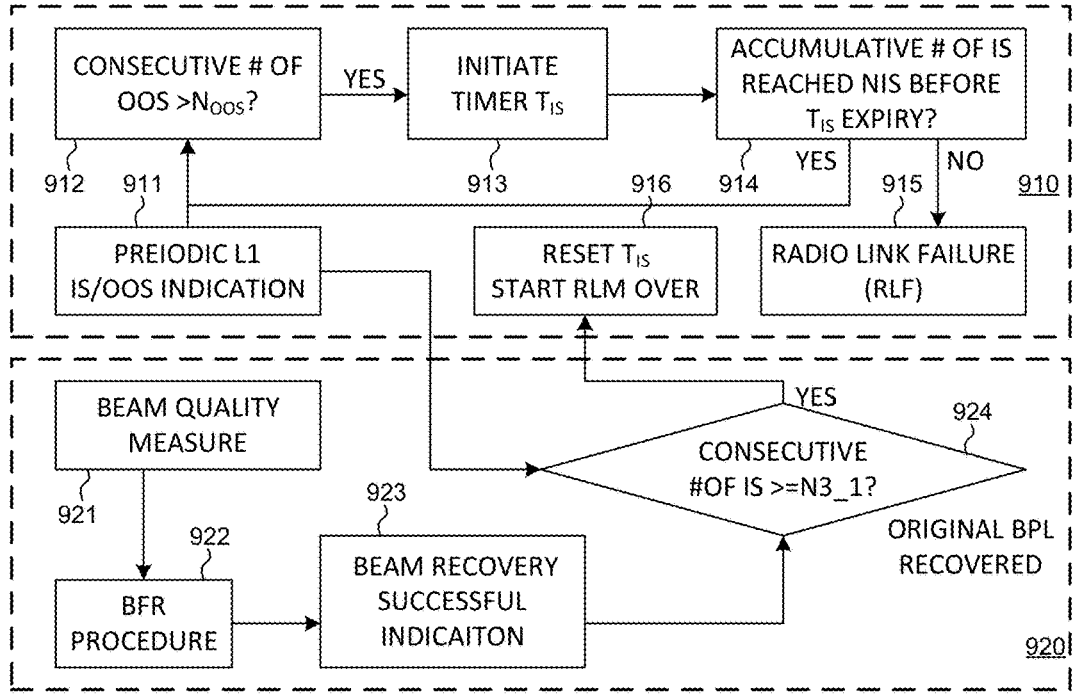
FIG. 9 illustrates a second embodiment of early RLM reset due to successful BFR.

FIG. 9 illustrates a second embodiment of early RLM reset due to successful BFR. The embodiment of FIG. 9 is similar to the embodiment of FIG. 8. However, in the embodiment of FIG. 9, no timer T3 is initiated upon BFR successful indication. Instead, the indication initiates a counter to start counting consecutively observed IS indications. In step 924, UE determines whether a consecutive number of IS indications has reached a threshold N3_1, which can be configured by the network. If the answer is YES, then an indication can be provided to RRC, which optionally resets the $T_{IS}$ timer and starts over RLM procedure 910 (step 916).

Figure 10:
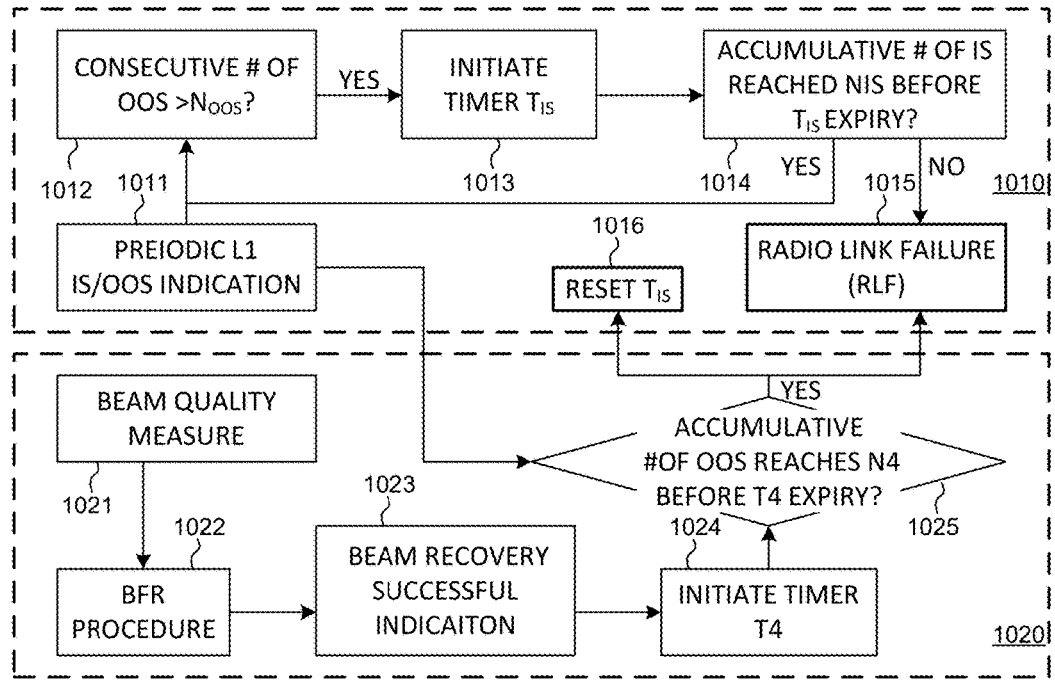
FIG. 10 illustrates a first embodiment of inconsistent RLM/BFR leading to RLF.

FIG. 10 illustrates a first embodiment of inconsistent RLM/BFR leading to RLF. In the embodiment of FIG. 10, the RLM procedure 1010 is similar to the RLM procedure 310 depicted in FIG. 3, e.g., steps 1011 to 1015 are similar to steps 311 to 315. The BFR procedure 1020 of FIG. 10 is modified based on the BFR procedure 320 of FIG. 3. Under the embodiment of FIG. 10, an indication can be provided to RRC (where RLM procedure is overseen) upon successful recovery from beam failure. The indication can trigger RRC to observe certain amount of OOS indications before RLM can be reset. As a result, the BFR procedure may leading to RLF.

Under the BFR procedure 1020, UE measures beam quality of the serving BPL(s) in step 821 and initiates the BFR procedure upon detecting beam failure and identifying new BPL in step 1022. In step 1023, UE determines that the BFR procedure is successful and sends an indication to RRC. The indication initiates a timer T4 accordingly (step 1024). In step 1025, UE determines whether an accumulative number of OOS indications has reached a threshold N4 before timer T4 expiry. If the answer is YES, then UE goes to step 1015 and declares RLF. UE also resets the $T_{IS}$ timer for the RLM procedure (step 1016). If the answer is NO, then no RLF is declared. The values for timer T4 and counter N4 can be configured by the network. Note that RLF is triggered despite successful BFR procedure, e.g., due to orthogonal RS for RLM and BFR.

The embodiment of FIG. 10 may be modified at step 1024. Instead of initiating a simple timer T4, the expiration value for timer T4 is dependent from the status of timer $T_{IS}$ of the RLM procedure. For example, if TIS is running, then timer T4 is initiated with a first expiration value #1; otherwise, if TIS is not running, then timer T4 is initiated with a second expiration value #2. In one embodiment, the first expiration value #1 has longer value than the second expiration value #2. As $T_{IS}$ is running, it may take a longer time for the IS/OOS observation to converge to newly recovered beam.

Figure 11:
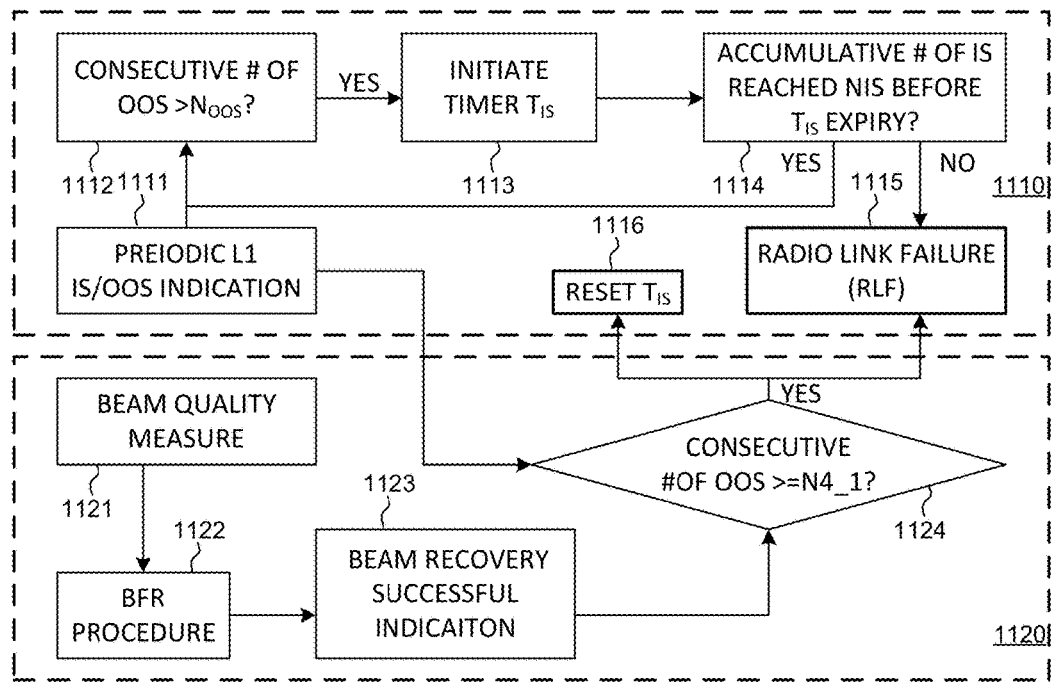
FIG. 11 illustrates a second embodiment of inconsistent RLM/BFR leading to RLF.

FIG. 11 illustrates a second embodiment of inconsistent RLM/BFR leading to RLF. The embodiment of FIG. 11 is similar to the embodiment of FIG. 10. However, in the embodiment of FIG. 11, no timer T4 is initiated upon BFR successful indication. Instead, the indication initiates a counter to start counting consecutively observed OOS indications. In step 1124, UE determines whether a consecutive number of OOS indications has reached a threshold N4_1, which can be configured by the network. If the answer is YES, then UE goes to step 1115 and declares RLF. UE also resets the $T_{IS}$ timer for the RLM procedure (step 1116). If the answer is NO, then no RLF is declared.

Figure 12:
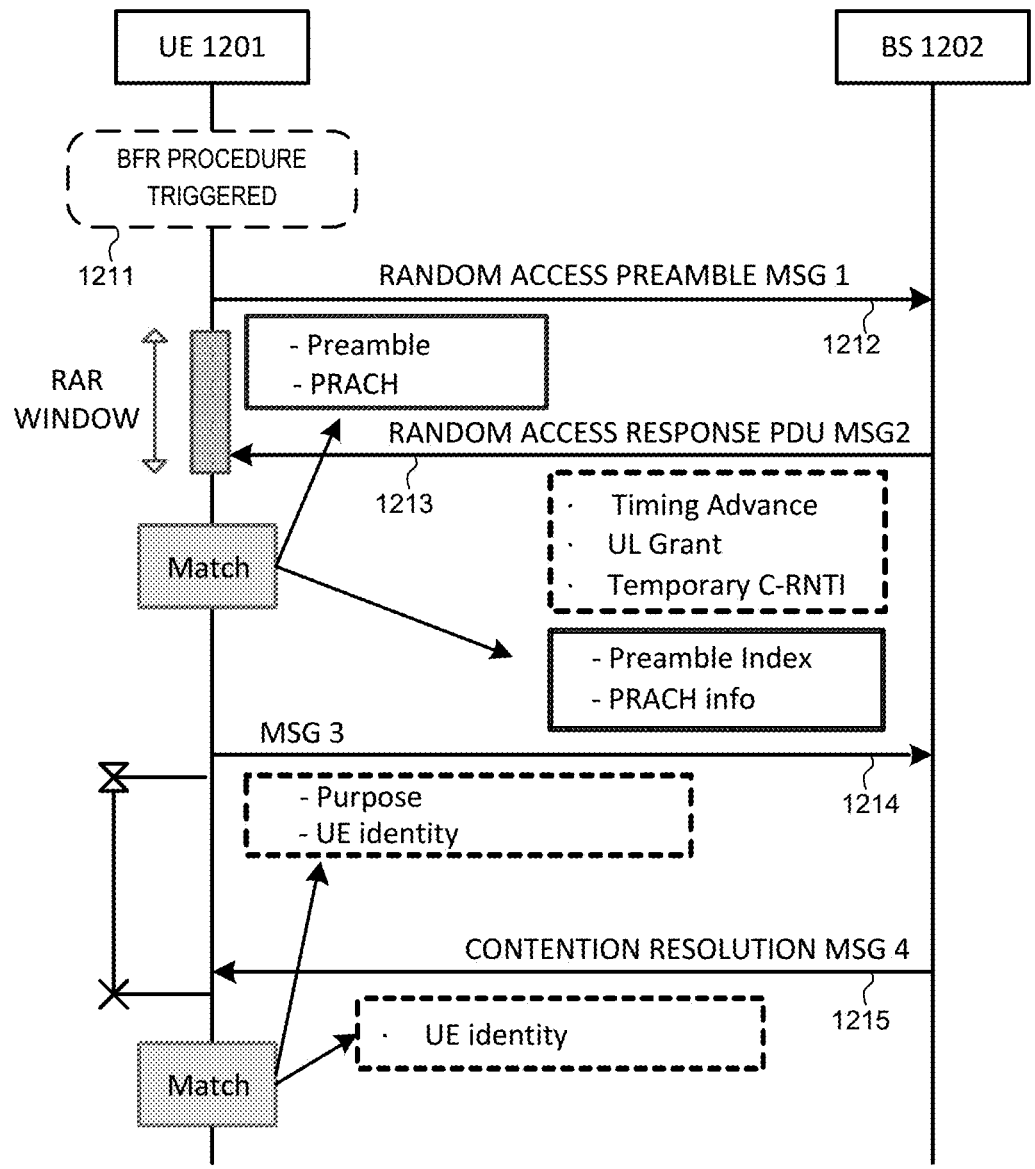
FIG. 12 illustrates beam recovery request transmission and network response monitoring based on a 4-step RACH procedure.

FIG. 12 illustrates beam recovery request transmission and network response monitoring based on a 4-step RACH procedure. Upon detecting beam failure of serving BPL and identifying candidate BPL, a 4-step RACH procedure can be used for beam failure recovery request (BFRQ) transmission and NW response monitoring. However, from NW perspective, NW cannot differentiate the purpose between "UL data arrival", and "beam failure recovery. A new MAC control element is introduced for identifying UE purpose of beam recovery request.

In step 1211, UE 1201 triggers the BFR procedure. During BFR procedure, a 4-step RACH procedure can be used for BFRQ transmission. In step 1212, UE 1201 transmits a random-access preamble (MSG1) to BS 1202. The preamble is transmitted with a specific preamble sequence over a specific PRACH resource. In step 1213, UE 1201 monitors random access response (RAR) PDU (MSG2) within an RAR window. UE 1201 finds an RAR with matching preamble index and PRACH info. The RAR can carry timing advance, uplink grant, and temporary C-RNTI for the UE. In step 1214, UE 1201 transmits an uplink request (MSG3) to BS 1202. The MSG3 comprises a new MAC CE for identifying a purpose of the MSG3 and UE identity. In one example, the UE purpose is to contend for uplink access. In another example, the UE purpose is to recover from beam failure. In step 1215, UE 1201 receives a contention resolution (MSG4) from BS 1202 with matching UE identity.

Without the "purpose indication" in MSG3, NW cannot differentiate UE purpose between "BFR" and regular "UL traffic needing UL grant". For "UL traffic needing UL grant", MSG4 can carry UL grant signaling for UL traffic transmission. For "BFR", most likely, BS 1202 would need to trigger aperiodic beam reporting. In addition, BS 1202 would know that the original serving BPL(s) not working reliably, and should be avoided.

Figure 13:
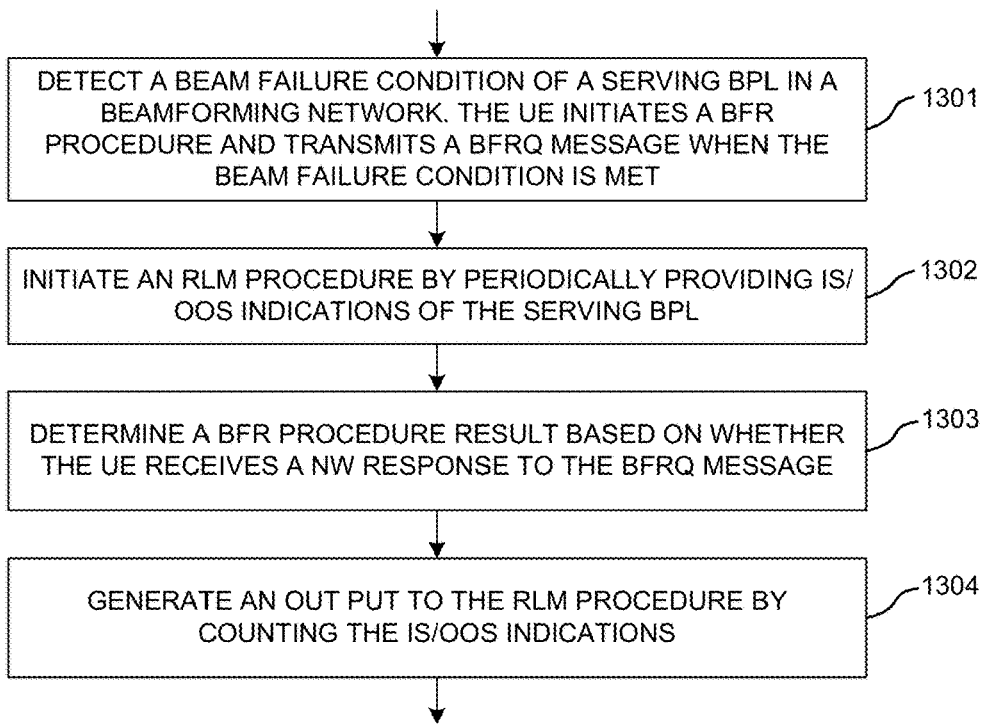
FIG. 13 is a flow chart of a method of harmonized operation between RLM and BFR in a beamforming system in accordance with one novel aspect.

FIG. 13 is a flow chart of a method of harmonized operation between RLM and BFR in a beamforming system in accordance with one novel aspect. In step 1301, a UE detects a beam failure condition of a serving beam pair link (BPL) in a beamforming communication network, wherein the UE initiates a beam failure recovery (BFR) procedure and transmits a beam failure recovery (BFRQ) message when the beam failure condition is met. In step 1302, the UE initiates a radio link monitor (RLM) procedure by periodically providing In-Sync (IS) and Out-of-Sync (OOS) indications of the serving BPL. In step 1303, the UE determines a BFR procedure result based on whether the UE receives a network response to the BFRQ message. In step 1304, the UE generates an output to the RLM procedure by counting the IS and OOS indications.

Figure 14:
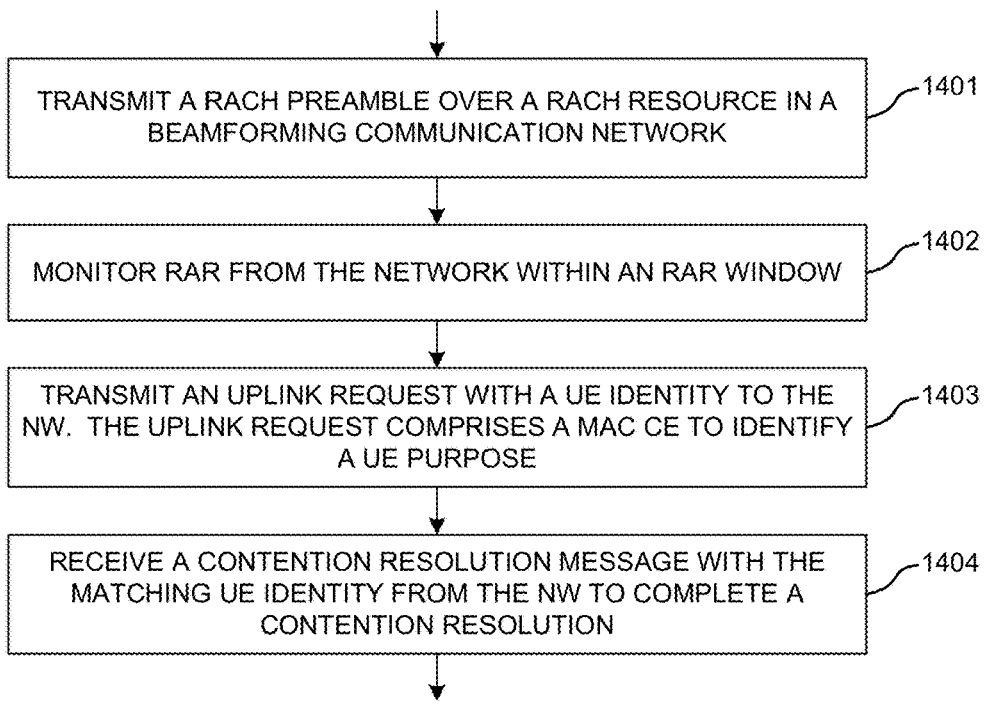
FIG. 14 is a flow chart of a method of BFRQ transmission using a 4-step RACH procedure in a beamforming system in accordance with one novel aspect.

FIG. 14 is a flow chart of a method of BFRQ transmission using a 4-step RACH procedure in a beamforming system in accordance with one novel aspect. In step 1401, a UE transmits a random-access preamble over a random-access channel (RACH) in a beamforming communication network. In step 1402, the UE monitors a random-access response (RAR) from the network within an RAR window. In step 1403, the UE transmits an uplink request with a UE identification to the network. The uplink request comprises a MAC control element (CE) to identify a UE purpose. In step 1404, the UE receives a contention resolution message with the matching UE identification from the network to complete a contention resolution.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   detecting a beam failure condition of a serving beam pair link (BPL) by a user equipment (UE) in a beamforming communication network, wherein the UE initiates a beam failure recovery (BFR) procedure and transmits a beam failure recovery (BFRQ) message when the beam failure condition is met;
   initiating a radio link monitor (RLM) procedure by the UE by periodically providing In-Sync (IS) and Out-of-Sync (OOS) indications of the serving BPL;
   determining a BFR procedure result based on whether the UE receives a network response to the BFRQ message; and
   generating an output to the RLM procedure by counting the IS and OOS indications, wherein the output triggers an RLM procedure reset or triggers a radio link failure (RLF) declaration in accordance with the BFR procedure result.

2. The method of claim 1, wherein the UE initiates a timer upon determining the BFR procedure is unsuccessful, and wherein the UE declares radio link failure (RLF) when a number of accumulative OOS indications reaches a threshold before the timer expires.

3. The method of claim 1, wherein the UE starts counting OOS-indications upon determining the BFR procedure is unsuccessful, and wherein the UE declares radio link failure (RLF) when a number of consecutive OOS-indications reaches a threshold.

4. The method of claim 1, wherein the UE initiates a timer upon determining the BFR procedure is unsuccessful, and wherein the UE restarts the RLM procedure when a number of accumulative IS-indications reaches a threshold before the timer expires.

5. The method of claim 1, wherein the UE starts counting IS-indications upon determining the BFR procedure is unsuccessful, and wherein the UE restarts the RLM procedure when a number of consecutive IS-indications reaches a threshold.

6. The method of claim 1, wherein the UE initiates a timer upon determining the BFR procedure is successful, and wherein the UE restarts the RLM procedure when a number of accumulative IS-indications reaches a threshold before the timer expires.

7. The method of claim 1, wherein the UE starts counting IS-indications upon determining the BFR procedure is successful, and wherein the UE restarts the RLM procedure when a number of consecutive IS-indications reaches a threshold.

8. A User Equipment (UE), comprising:
   a receiver that receives reference signals and detects a beam failure condition of a serving beam pair link (BPL) in a beamforming communication network;
   a radio link monitor (RLM) handling circuits that initiates an RLM procedure by periodically providing In-Sync (IS) and Out-of-Sync (OOS) indications of the serving BPL;
   a beam failure recovery (BFR) handling circuits that initiates a BFR procedure and transmits a beam failure recovery request (BFRQ) message when the beam failure condition is met, wherein the BFR handling circuits determines a BFR procedure result based on whether the UE receives a network response to the BFRQ message; and
   a BFR/RLM coordinating circuit that generates an output to the RLM procedure by counting the IS and OOS indications, wherein the output triggers an RLM procedure reset or triggers a radio link failure (RLF) declaration in accordance with the BFR procedure result.

9. The UE of claim 8, wherein the UE initiates a timer upon determining the BFR procedure is unsuccessful, and wherein the UE declares radio link failure (RLF) when a number of accumulative OOS indications reaches a threshold before the timer expires.

10. The UE of claim 8, wherein the UE starts counting OOS-indications upon determining the BFR procedure is unsuccessful, and wherein the UE declares radio link failure (RLF) when a number of consecutive OOS-indications reaches a threshold.

11. The UE of claim 8, wherein the UE initiates a timer upon determining the BFR procedure is unsuccessful, and wherein the UE restarts the RLM procedure when a number of accumulative IS-indications reaches a threshold before the timer expires.

12. The UE of claim 8, wherein the UE starts counting IS-indications upon determining the BFR procedure is unsuccessful, and wherein the UE restarts the RLM procedure when a number of consecutive IS-indications reaches a threshold.

13. The UE of claim 8, wherein the UE initiates a timer upon determining the BFR procedure is successful, and wherein the UE restarts the RLM procedure when a number of accumulative IS-indications reaches a threshold before the timer expires.

14. The UE of claim 8, wherein the UE starts counting IS-indications upon determining the BFR procedure is successful, and wherein the UE restarts the RLM procedure when a number of consecutive IS-indications reaches a threshold.

* * * * *